(12) United States Patent
Yao et al.

(10) Patent No.: US 12,272,958 B1
(45) Date of Patent: Apr. 8, 2025

(54) POWER SUPPLY AND ENERGY STORAGE SYSTEM USING CARBON AS THE MEDIUM

(71) Applicants: Ningbo Electric Power Design Institute Co. Ltd, Ningbo (CN); Ningbo Institute of Materials Technology & Engineering, Chinese Academy of Sciences, Ningbo (CN); Ningbo Yongyao Power Investment Corporation Co., Ltd, Ningbo (CN)

(72) Inventors: Yan Yao, Ningbo (CN); Wanbing Guan, Ningbo (CN); Zixiang Pei, Ningbo (CN); Junhua Wang, Ningbo (CN); Puyan Wang, Ningbo (CN); Yuzhe Xie, Ningbo (CN); Xuanjun Chen, Ningbo (CN); Yuting Liu, Ningbo (CN); Jun Wu, Ningbo (CN); Wei Xue, Ningbo (CN); Tianchen Fan, Ningbo (CN)

(73) Assignees: Ningbo Electric Power Design Institute Co. Ltd, Ningbo (CN); Ningbo Institute of Materials Technology & Engineering, Chinese Academy of Sciences, Ningbo (CN); Ningbo Yongyao Power Investment Corporation Co., Ltd, Ningbo (CN)

(*) Notice: Subject to any disclaimer, the term of this patent is extended or adjusted under 35 U.S.C. 154(b) by 0 days.

(21) Appl. No.: 18/659,764

(22) Filed: May 9, 2024

(30) Foreign Application Priority Data

Feb. 19, 2024 (CN) .......................... 202410181832

(51) Int. Cl.
*H02J 3/46* (2006.01)
*H02J 15/00* (2006.01)

(52) U.S. Cl.
CPC ................ *H02J 3/46* (2013.01); *H02J 15/00* (2013.01); *H02J 2300/10* (2020.01); *H02J 2300/24* (2020.01); *H02J 2300/28* (2020.01)

(58) Field of Classification Search
CPC .......... H02J 3/46; H02J 15/00; H02J 2300/10; H02J 2300/24; H02J 2300/28
(Continued)

(56) References Cited

U.S. PATENT DOCUMENTS

2024/0191702 A1* 6/2024 Wu ........................ F03G 6/001

FOREIGN PATENT DOCUMENTS

CN 116575989 A 8/2023

OTHER PUBLICATIONS

CN 202410181832.1, Grant of Notice of Patent Right for Invention, mailed Apr. 15, 2024, 3 pages. (with English translation).
(Continued)

*Primary Examiner* — Daniel Kessie
*Assistant Examiner* — Dru M Parries
(74) *Attorney, Agent, or Firm* — Getech Law LLC; Jun Ye

(57) ABSTRACT

The present invention relates to the technical field of power generation of power systems, and in particular to a power supply and energy storage system using carbon as a medium. The power supply and energy storage system generates energy by reacting carbon dioxide and air, collects carbon monoxide by providing a pressurizing apparatus and a gas storage apparatus, and sends the collected carbon monoxide back to an energy supply apparatus during power consumption peaks, thereby balancing power deficits of loads and renewable energy power generation, considering the stability, reliability, and economic efficiency of the power supply and energy storage system, and improving energy utilization efficiency.

7 Claims, 1 Drawing Sheet

(58) Field of Classification Search
USPC .......................................................... 307/25
See application file for complete search history.

(56) References Cited

OTHER PUBLICATIONS

CN 202410181832.1, Notice of First Review Opinion, mailed Apr. 3, 2024, 10 pages. (with English machine translation).

* cited by examiner

POWER SUPPLY AND ENERGY STORAGE SYSTEM USING CARBON AS THE MEDIUM

TECHNICAL FIELD

The present invention relates to the technical field of power generation of power systems, and in particular to a power supply and energy storage system using carbon as a medium.

BACKGROUND

With the introduction of the carbon peaking and carbon neutrality goals, it has become inevitable to construct a clean, low-carbon, and efficient energy system as well as a new type of power system dominated by new energy sources, and the predominant role of renewable energy in future power systems has further been established. Currently, the proportion of solar power generation and wind power generation in China's power structure is increasing.

Because solar power generation and wind power generation on an island or in a microgrid exhibit strong time sequence and randomness, a power deficit or power surplus is easily generated, resulting in poor power supply reliability; moreover, insufficient collection and utilization of carbon dioxide leads to an increased cost; at the same time, in the carbon dioxide cycle, the heat energy and cold energy in the process are not collected and utilized, resulting in energy source waste and low energy conversion efficiency.

SUMMARY

The present invention provides a power supply and energy storage system using carbon as a medium to solve the above-mentioned problems.

Provided is a power supply and energy storage system using carbon as a medium, wherein the power supply and energy storage system comprises an energy provision unit, a heat conversion unit, a power supply unit, and a carbon dioxide collection unit, wherein the energy provision unit comprises renewable energy sources, a diesel generator, a battery, and hydrogen storage;

the heat conversion unit comprises a first compressor set, an energy release assembly, a first expander set, and an energy absorption assembly which are sequentially connected, wherein the energy release assembly exchanges heat with a hot tank, the energy absorption assembly exchanges heat with a cold tank, and the first compressor set is provided with energy by the energy provision unit;

the power supply unit comprises a pressure boosting unit, a first carbon dioxide storage tank, a first heat exchanger, a first expander set, a second heat exchanger, and a second carbon dioxide storage tank which are sequentially connected, wherein the energy provision unit provides energy for the pressure boosting unit, the first heat exchanger utilizes heat of the hot tank, the second heat exchanger utilizes heat of the cold tank, and the first expander set applies work to the outside through a generator; and the carbon dioxide collection unit comprises a cooling unit, an absorption tank, a transit tank, a third heat exchanger, a regeneration tank, and a second compressor set along with a sequestration device connected thereto, which are sequentially connected, wherein the transit tank comprises a first-stage transit tank and a second-stage transit tank, the cooling unit is provided with energy by the energy provision unit, and the carbon dioxide collection unit is used to collect carbon dioxide from the combustion vent gas of the diesel generator, and the collected carbon dioxide is used for energy transfer of the heat conversion unit.

The renewable energy sources comprise solar energy and wind energy, and the diesel generator, the battery, and the hydrogen storage are used to make up for power supply gaps of solar energy and wind energy.

with a target of minimizing an average annual comprehensive cost C of the energy provision unit, a target function of a capacity configuration model for solar energy, wind energy, the diesel generator, the battery, and the hydrogen storage is:

$$minC=min(1/N\ C_1+C_2+C_3+C_4)$$

wherein N represents a planned service life of the energy provision unit, $C_1$ represents a total one-time cost of all devices of the energy provision unit, $C_2$ represents an operation and maintenance cost of the energy provision unit per year, $C_3$ represents a penalty cost of insufficient energy provision, and $C_4$ represents a penalty cost of excessive energy provision;

$$C_3 = \mu \sum_{t=0}^{T} P_{loss} \Delta t$$

$$P_{loss} = \begin{cases} 0, & P_m \leq P_{mj} \\ P_m - P_{mj}, & P_m > P_{mj} \end{cases}$$

wherein μ represents a penalty coefficient for electric power shortage, $P_{loss}$ represents a power gap of the energy provision unit, Δt represents a time step, T represents a calculation cycle, $P_{mj}$ represents power generated by the energy provision unit, and $P_m$ represents a sum of power of all loads, comprising a power consumption load and a loading load of the carbon dioxide collection unit in the power supply and energy storage system;

$$C_4 = \rho \sum_{t=0}^{T} P_{waste} \Delta t$$

$$P_{waste} = \begin{cases} 0, & P_{mj} \leq P_m \\ -(P_m - P_{mj}), & P_{mj} > P_m \end{cases}$$

wherein ρ represents a penalty coefficient for residual electricity, $P_{waste}$ represents remaining power of the energy provision unit, Δt represents a time step, T represents a calculation cycle, $P_{mj}$ represents power generated by the energy provision unit, and $P_m$ represents a sum of power of all loads, comprising a power consumption load and a loading load of the carbon dioxide collection unit in the power supply and energy storage system.

A sum of power generated by solar power generation, wind power generation, the diesel generator, the battery, and the hydrogen storage is equal to the sum of power of all loads, namely:

$$P_s+P_w+P_c=P_m,$$

wherein $P_s$ represents the output power of solar power generation, $P_w$ represents the output power of wind power generation, and $P_c$ represents the output power of the diesel generator, the battery, and the hydrogen storage.

Solar power generation satisfies a maximum power constraint, namely $0 \leq P_s \leq P_{smax}$, wherein $P_{smax}$ represents the maximum output power of solar energy power generation;

wind power generation satisfies a maximum power constraint, namely $0 \leq P_w \leq P_{wmax}$, wherein $P_{wmax}$ represents the maximum output power of wind power generation; and the diesel generator, the battery, and the hydrogen storage satisfy a maximum power constraint, namely $0 \leq P_c \leq P_{cmax}$, wherein $P_{cmax}$ represents the maximum output power of the diesel generator, the battery, and the hydrogen storage.

The capacity optimization configuration model of solar energy, wind energy, the diesel generator, the battery, and the hydrogen storage is solved by a quantum-behaved particle swarm optimization algorithm.

A rate of putting into use $\delta_c$ of the diesel generator, the battery, and the hydrogen storage is:

$$\delta_c = \frac{P_b}{P_m} = \frac{P_m - P_s - P_w}{P_m} \leq \delta_{cmax}$$

wherein in the formula, $P_b$ represents a power deficit of the renewable energy sources;

$\delta_{cmax}$ represents a maximum rate of putting into use of the diesel generator, the battery, and the hydrogen storage.

In the solving process, the power deficit $P_b$ of the renewable energy sources is converted from discrete data in a time domain into frequency and amplitude in a frequency domain using discrete Fourier transform, based on energy and power characteristics of the diesel generator, the battery, and the hydrogen storage, frequency compensation bands for the diesel generator, the battery, and the hydrogen storage are determined according to a spectrum analysis result, and frequency-domain data are then converted into time-domain data by inverse discrete Fourier transform, such that power deficits allocated to the diesel generator, the battery, and the hydrogen storage at each moment can be obtained.

In a specific embodiment, the system further comprises a pressurizing apparatus, connected to the heat conversion unit and collecting and pressurizing carbon monoxide generated in the heat conversion unit; and a gas storage apparatus, connected to the pressurizing apparatus and the energy provision unit, with the pressurized carbon monoxide by the pressurizing apparatus transported to the gas storage apparatus, wherein when the power supply system is in power consumption peaks, the carbon monoxide in the gas storage apparatus is transported to the energy provision unit for generating energy.

The technical solutions provided in the present invention include the following beneficial effects:
1. The energy provision unit of the present application includes renewable energy sources, a diesel generator, a battery, and hydrogen storage. According to the power balance of loads and with a target of minimizing an average annual comprehensive cost of the energy provision unit, capacities of the diesel generator, the battery, and the hydrogen storage are configured, thereby effectively balancing power deficits of the loads and renewable energy power generation and considering the reliability and economic efficiency of the power supply and energy storage system.
2. In combination with the characteristics of the diesel generator, the battery, and the hydrogen storage, the present application uses the diesel generator, the battery, and the hydrogen storage to make up for the high-frequency part, the intermediate-frequency part, and the low-frequency part of the power deficit of the renewable energy sources, respectively, and adopts discrete Fourier transform and inverse discrete Fourier transform to obtain power deficits allocated to the diesel generator, the battery, and the hydrogen storage at each moment, thereby improving the working efficiency of the diesel generator, the battery, and the hydrogen storage, and losing less service life.
3. In the heat conversion unit of the present application, an energy release assembly is adopted to exchange heat with a hot tank, an energy absorption assembly is adopted to exchange heat with a cold tank, a first heat exchanger utilizes the heat of the hot tank, and a second heat exchanger utilizes the heat of the cold tank, thereby improving energy utilization efficiency.
4. In the present application, carbon dioxide from the diesel combustion vent gas of the diesel generator is collected by the carbon dioxide collection unit and is used as an energy transfer medium of the heat conversion unit, such that the cyclic utilization of the carbon dioxide medium in an isolated range is achieved; in addition, when the spare capacity of the energy provision unit is insufficient, an absorption solution with a higher concentration enters a second-stage transit tank from a first-stage transit tank, and when the spare capacity of the energy provision unit is sufficient, the absorption solution with a higher concentration in the second-stage transit tank reenters a third heat exchanger, a regeneration tank, and a second compressor set along with a sequestration device connected thereto for purification, compression, and storage, such that power supply for the load and the heat conversion mechanism are ensured to the maximum extent, and the stability of power supply is improved.

BRIEF DESCRIPTION OF THE DRAWINGS

To clarify the technical solutions of the embodiments of the present invention, a brief introduction of the drawings to be used in the description of the embodiments will be provided below. It is evident that the drawings described below are only for some embodiments of the present invention. For those skilled in the art, additional drawings may be obtained based on the drawings without creative efforts.

DETAILED DESCRIPTION

Figure 1:
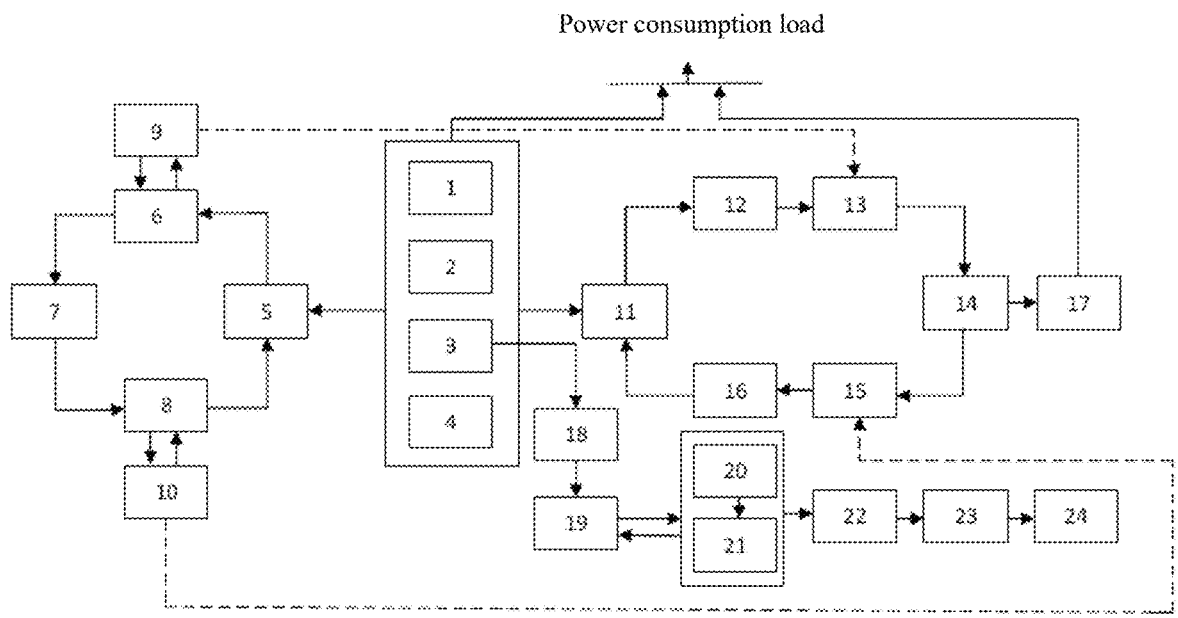
FIG. 1 is one of the schematic diagrams of a power supply and energy storage system according to the present invention.

To make the objectives, technical solutions, and advantages of the embodiments of the present application clearer, the technical solutions in the embodiments of the present application will be clearly and completely described below with reference to the drawings in the embodiments of the present application. It is evident that the described embodiments are some, but not all embodiments of the present application. Components of the embodiments of the present application generally described and illustrated in the drawing herein may be arranged and designed in various configurations.

Therefore, the following detailed description of the embodiments of the present application provided in the drawings is not intended to limit the scope of the present application as claimed, but merely represents selected embodiments of the present application. Based on the embodiments of the present application, all other embodiments obtained by those skilled in the art without creative work shall fall within the protection scope of the present application.

It should be noted that similar reference numerals and letters refer to similar items in the following drawings, and thus, once an item is defined in one figure, it need not be further defined or explained in the subsequent drawings.

It should be noted that the term "comprising" or any other variants are intended to cover non-exclusive inclusion. Thus, a process, method, item, or device comprising a series of elements includes not only those elements but also other elements not explicitly listed, or elements inherent to such process, method, item, or device.

Without further limitation, an element defined by the phrase "including a . . . " does not exclude the presence of additional identical elements in the process, method, item, or device that includes the element.

Some embodiments of the present application will be described in detail below with reference to the accompanying drawings. Unless conflicting, the embodiments and the features of the embodiments below may be combined with each other.

Embodiment 1

The present invention provides a power supply and energy storage system for new energy power generation using carbon dioxide as a medium. Referring to FIG. 1, the power supply and energy storage system includes an energy provision unit, including renewable energy sources 1, a diesel generator 2, a battery 3, and hydrogen storage 4;

a heat conversion unit, including a first compressor set 5, an energy release assembly 6, a first expander set 7, an energy absorption assembly 8, a hot tank 9, and a cold tank 10, wherein the first compressor set 5 is provided with energy by the energy provision unit to complete the pressurization and temperature rise of carbon dioxide, the first compressor set 5 is connected to the energy release assembly 6, and the carbon dioxide after the pressurization and temperature rise enters the energy release assembly 6 for condensation, with the released heat stored in the hot tank 9; the energy release assembly 6 is connected to the first expander set 7, the condensed carbon dioxide is reduced in temperature and enters the first expander set 7 to expand outward to apply work; the first expander set 7 is connected to the energy absorption assembly 8, and the carbon dioxide discharged from the first expander set 7 enters the energy absorption assembly 8 for temperature rise, with the cold energy generated in the temperature rise process stored in the cold tank 10; the energy absorption assembly 8 is connected to the first compressor set 5, and the carbon dioxide after temperature rise enters the first compressor set 5 to continue the cycle of heat conversion; the energy release assembly 6 exchanges heat with the hot tank 9, and the energy absorption assembly 8 exchanges heat with the cold tank 10;

a power supply unit, including a pressure boosting unit 11, a first carbon dioxide storage tank 12, a first heat exchanger 13, a first expander set 14, a second heat exchanger 15, a second carbon dioxide storage tank 16, and a generator 17, wherein the energy provision unit provides energy for the pressure boosting unit 11, the pressure boosting unit 11 achieves pressurization of carbon dioxide from low pressure and converts the carbon dioxide from a gaseous state to a liquid state, and the pressure boosting unit 11 may adopt a pump; the pressure boosting unit 11 is connected to the first carbon dioxide storage tank 12, with the liquid carbon dioxide stored in the first carbon dioxide storage tank 12; the first carbon dioxide storage tank 12 is connected to the first heat exchanger 13, the liquid carbon dioxide is heated in the first heat exchanger 13, and the first heat exchanger 13 fully utilizes the heat from the hot tank 9; the first heat exchanger 13 is connected to the first expander set 14, the carbon dioxide after temperature rise enters the first expander set 14, and the first expander set 14 applies work to the outside through the generator 17; the first expander set 14 is connected to the second heat exchanger 15, the high-temperature carbon dioxide discharged from the first expander set 14 enters the second heat exchanger 15, the high-temperature carbon dioxide is cooled in the second heat exchanger 15, and the second heat exchanger 15 fully utilizes the heat from the cold tank 10; the second heat exchanger 15 is connected to the second carbon dioxide storage tank 16, and the cooled carbon dioxide enters the second carbon dioxide storage tank 16 for recovery of the carbon dioxide medium; and a carbon dioxide collection unit, including a cooling unit 18, an absorption tank 19, a transit tank, a third heat exchanger 22, a regeneration tank 23, and a second compressor set along with a sequestration device connected thereto 24, which are sequentially connected, wherein the transit tank includes a first-stage transit tank 20 and a second-stage transit tank 21; the cooling unit 18 is provided with energy by the energy provision unit, and the carbon dioxide collection unit is used to collect carbon dioxide from the diesel combustion vent gas of the diesel generator and use the carbon dioxide as an energy transfer medium for the heat conversion unit.

The vent gas of the diesel generator is cooled by the cooling unit 18 before entering the absorption tank 19 and dissolves in a monoethanolamine solvent in the absorption tank 19, and after full dissolution, an absorption solution is formed. The absorption solution is separated according to different concentrations, the absorption solution with a higher concentration enters the first-stage transit tank 20, and the absorption solution with a lower concentration is returned to the absorption tank 19 for cyclic utilization to continuously dissolve the carbon dioxide from the vent gas of the diesel generator.

When the spare capacity of the energy provision unit is sufficient, the carbon dioxide collection unit works normally; the absorption solution with a higher concentration is discharged from the first-stage transit tank 20 and is subjected to purification, compression, and storage through the third heat exchanger 22, the regeneration tank 23, and the second compressor set and the sequestration device connected thereto 24; the absorption solution with a lower concentration is returned to the absorption tank 19.

When the spare capacity of the energy provision unit is insufficient, priority is given to ensuring power supply for the load and the heat conversion mechanism, and the absorption solution with a higher concentration is discharged from the first-stage transit tank 20 and then enters the second-stage transit tank 21; when the spare capacity of the energy provision unit is sufficient, the absorption solution with a higher concentration in the second-stage transit tank 21 reenters the third heat exchanger 22, the regeneration tank 23, and the second compressor set and the sequestration device connected thereto 24 for purification, compression, and storage; the absorption solution with a lower concentration is returned to the absorption tank 19.

Because the carbon dioxide collection unit needs to consume a large amount of energy, the process can play a buffering role, ensuring that the absorption tank can fully absorb the carbon dioxide from the vent gas of the diesel generator, and the absorption solution with a lower concentration enters the absorption tank.

The carbon dioxide collection unit collects and stores carbon dioxide generated by the diesel generator.

The renewable energy sources include solar energy and wind energy.

The diesel generator, the battery, and the hydrogen storage are mainly used to make up for power supply gaps of solar energy and wind energy to meet the power requirement of the load.

According to the power balance of the loads and with a target of minimizing an average annual comprehensive cost C of the energy provision unit, the target function of the capacity optimization configuration for solar energy, wind energy, the diesel generator, the battery, and the hydrogen storage is:

$$\min C = \min(1/N\ C_1 + C_2 + C_3 + C_4)$$

wherein N represents a planned service life of the energy provision unit, $C_1$ represents a total one-time cost of all devices of the energy provision unit, $C_2$ represents an operation and maintenance cost of the energy provision unit per year, $C_3$ represents a penalty cost of insufficient energy provision, and $C_4$ represents a penalty cost of excessive energy provision;

$$C_3 = \mu \sum_{t=0}^{T} P_{loss} \Delta t$$

$$P_{loss} = \begin{cases} 0, & P_m \leq P_{mj} \\ P_m - P_{mj}, & P_m > P_{mj} \end{cases}$$

wherein μ represents a penalty coefficient for electric power shortage, $P_{loss}$ represents a power gap of the energy provision unit, $\Delta t$ represents a time step, T represents a calculation cycle, $P_{mj}$ represents power generated by the energy provision unit, and $P_m$ represents a sum of power of all loads, comprising a power consumption load and a loading load of the carbon dioxide collection unit in the power supply and energy storage system;

$$C_4 = \rho \sum_{t=0}^{T} P_{waste} \Delta t$$

$$P_{waste} = \begin{cases} 0, & P_{mj} \leq P_m \\ -(P_m - P_{mj}), & P_{mj} > P_m \end{cases}$$

wherein ρ represents a penalty coefficient for residual electricity, $P_{waste}$ represents remaining power of the energy provision unit, $\Delta t$ represents a time step, T represents a calculation cycle, $P_{mj}$ represents power generated by the energy provision unit, and $P_m$ represents a sum of power of all loads, comprising a power consumption load and a loading load of the carbon dioxide collection unit in the power supply and energy storage system.

$P_m$ includes a power consumption load and a loading load of the carbon dioxide collection unit in the power supply and energy storage system.

The constraint conditions satisfied by the capacity optimization configuration model for solar energy, wind energy, the diesel generator, the battery, and the hydrogen storage are as follows:

according to the power balance of the system:

A sum of power generated by solar power generation, wind power generation, the diesel generator, the battery, and the hydrogen storage is equal to the sum of power of all loads, namely:

$$P_s + P_w + P_c = P_m,$$

wherein $P_s$ represents the output power of solar power generation, $P_w$ represents the output power of wind power generation, and $P_c$ represents the output power of the diesel generator, the battery, and the hydrogen storage.

Solar power generation satisfies a maximum power constraint, namely $0 \leq P_s \leq P_{smax}$, wherein $P_{smax}$ represents the maximum output power of solar energy power generation; wind power generation satisfies a maximum power constraint, namely $0 \leq P_w \leq P_{wmax}$, wherein $P_{wmax}$ represents the maximum output power of wind power generation; and the diesel generator, the battery, and the hydrogen storage satisfy a maximum power constraint, namely $0 \leq P_c \leq P_{cmax}$, wherein $P_{cmax}$ represents the maximum output power of the diesel generator, the battery, and the hydrogen storage.

The configuration model with the minimum average annual comprehensive cost of the energy provision unit is solved by a quantum-behaved particle swarm optimization algorithm.

The diesel generator, the battery, and the hydrogen storage have the functions of balancing power deficits of the loads and the renewable energy power generation.

If the power configuration for the diesel generator, the battery, and the hydrogen storage is too small, although the total one-time cost of all devices of the energy provision unit can be reduced, when the load demand is large, a power deficit of the renewable energy power generation cannot be made up for, resulting in a reduction in power supply reliability.

If the power configuration for the diesel generator, the battery, and the hydrogen storage is too large, although the reliability of the power supply and energy storage system can be improved, the investment cost of the energy provision unit is increased, thereby reducing the economic efficiency.

Therefore, a rate $\delta_c$ of putting into use of the diesel generator, the battery, and the hydrogen storage is set to characterize the proportion of the power deficit of the renewable energy sources to the loads, namely:

$$\delta_c = \frac{P_b}{P_m} = \frac{P_m - P_s - P_w}{P_m} \leq \delta_{cmax}$$

wherein in the formula, $P_b$ represents a power deficit of the renewable energy sources;

$\delta_{cmax}$ represents a maximum rate of putting into use of the diesel generator, the battery, and the hydrogen storage.

For the power deficit of the renewable energy sources, the discrete Fourier transform is adopted to convert discrete data in a time domain into frequency and amplitude in a frequency domain, based on energy and power characteristics of the diesel generator, the battery, and the hydrogen storage, frequency compensation bands for the diesel generator, the battery, and the hydrogen storage are determined according to a spectrum analysis result, and frequency-domain data are then converted into time-domain data by the inverse discrete Fourier transform, such that power deficits allocated to the diesel generator, the battery, and the hydrogen storage at each moment can be obtained.

First, the power deficit $P_b(t)$ of the renewable energy sources at time t is subjected to the discrete Fourier transform, wherein $$P_b(t) = \{P_b(1), \ldots, P_b(n), \ldots P_b(N)\},$$
$$S_b = DFT(P_b) = \{S_b(1), \ldots, S_b(n), \ldots S_b(N)\}$$
$$f_b = \{f_b(1), \ldots, f_b(n), \ldots f_b(N)\}$$

wherein $1 \leq n \leq N$, both n and N being positive integers, and $S_b(n)$ represents an amplitude corresponding to the n-th data frequency $f_b(n)$ after $P_b(t)$ is subjected to the discrete Fourier transform.

The diesel generator has the characteristics of high output power and fast response speed, and is suitable for making up for the high-frequency part of the power deficit of the renewable energy sources; the battery has the characteristics of high power density and long discharge time, and is suitable for making up for the intermediate-frequency part of the power deficit of the renewable energy sources;

the hydrogen storage has the highest power density among the three and the longest power supply time, and is suitable for making up for the low-frequency part of the power deficit of the renewable energy sources. The power deficit of the renewable energy sources is subjected to frequency division and is undertaken by the diesel generator, the battery, and the hydrogen storage, respectively, such that the deficit can be counteracted.

In order to achieve higher working efficiency of the diesel generator, the battery, and the hydrogen storage with less loss of service life, the diesel generator, the battery, and the hydrogen storage need to be subjected to frequency band division.

The working frequency band of the diesel generator is set to be $f_{bc} \cup f_{bc1}$, wherein $f_{bc}$ represents the working frequency of the diesel generator, $f_{bc}=[f_{bc-min}, f_{bc-max}]$, $f_{bc-min}$, and $f_{bc-max}|$ respectively represent end points of the working frequency band of the diesel generator, $f_{bc1}$ represents the working frequency of $f_{bc}$ in $S_b$ that is symmetric to $f_{bc}$ with the Nyquist frequency as a symmetry axis, $$S_{bc}=[S_{bc}(1), \ldots, S_{bc}(n), \ldots, S_{bc}(N)]$$

represents the amplitude of the corresponding working frequency band of the diesel generator in the spectrum analysis result, $$S_{bx}=[S_{bx}(1), \ldots, S_{bx}(n), \ldots, S_{bx}(N)]:$$

represents the amplitude of the corresponding working frequency band of the battery in the spectrum analysis result, $$S_{bq}=[S_{bq}(1), \ldots, S_{bq}(n), \ldots, S_{bq}(N)]:$$

represents the amplitude of the corresponding working frequency band of the hydrogen storage in the spectrum analysis result, and the amplitudes outside the working frequency band are all set to be 0. The working frequency band switching point between the diesel generator and the battery is set to be i, and the working frequency band switching point between the battery and the hydrogen storage is set to be j, then $$\begin{cases} S_{bc} = [S_{bc}(1), \ldots, S_{bc}(i-1), 0, \ldots, 0, 0, \ldots, 0] \\ S_{bx} = [0, \ldots, 0, S_{bx}(i), \ldots, S_{bx}(j-1), 0, \ldots, 0] \\ S_{bq} = [0, \ldots, 0, 0, \ldots, 0, S_{bq}(j), \ldots, S_{bq}(N)] \end{cases}$$

$S_{bc}$, $S_{bx}$, and $S_{bq}$ are subjected to the inverse Fourier transform, and the output of the diesel generator, the battery, and the hydrogen storage which is allocated at time t in the corresponding time domains to make up for the power deficit can be obtained.

According to a simulation result of the power supply and energy storage system on a certain island, it can be seen that the output power of the diesel generator is stabilized between 10%-90% of its rated power, the SOC of the battery is stabilized between 15%-85%, and the equivalent SOC of the hydrogen storage is stabilized between 5%-95%, such that the excessive consumption of the diesel generator and the excessive charging and discharging of the battery and the hydrogen storage are avoided, the service life loss is reduced, and the service life is prolonged.

Comparing the operation results, it can be seen that hydrogen storage exhibits a slower variation in SOC values compared to batteries. This is because hydrogen storage can smooth out the frequency bands with the lowest frequency variation in system imbalance power, which corresponds to the slowest variations in SOC values.

Before the diesel generator, the battery, and the hydrogen storage were connected, there was a significant power deficit or power surplus in the system. The maximum power shortage reached 18 MW, and the maximum power surplus reached 15 MW. After the diesel generator made up for the high-frequency part of the power deficit of the renewable energy sources, the battery made up for the intermediate-frequency part of the power deficit of the renewable energy sources, the hydrogen storage made up for the low-frequency part of the power deficit of the renewable energy sources, the power deficit or power surplus of the system after being balanced was greatly reduced compared with the previous condition.

The maximum power shortage was reduced to 3.1 MW, and the maximum power surplus was reduced to 4.3 W. Throughout the year, the system's power deficit or power surplus met the requirement, greatly improving system reliability. The integrated configuration of renewable energy sources with the energy storage diesel generator, the battery, and the hydrogen storage in the present case provides the capacity and power that can balance the most economic efficiency and the assurance of safe and stable operation of the system.

Figure 2:
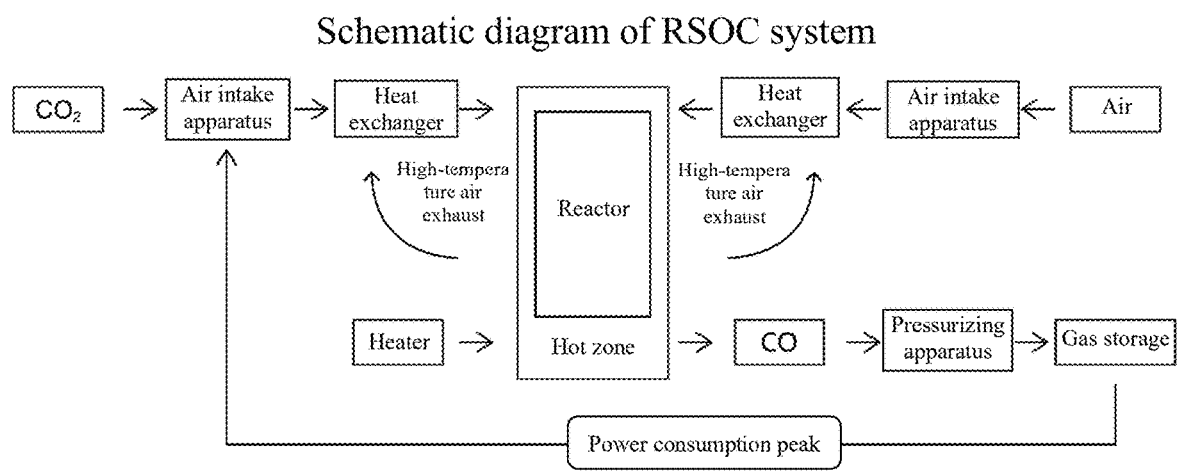
FIG. 2 is the other schematic diagram of the power supply and energy storage system according to the present invention.

Specifically, referring to FIG. 2, the power supply and energy storage system for new energy power generation using carbon dioxide as a medium further includes: a pressurizing device, connected to the heat conversion unit and collecting and pressurizing carbon monoxide generated in the heat conversion unit; and a gas storage apparatus, connected to the pressurizing apparatus and the energy provision unit, with the pressurized carbon monoxide by the pressurizing apparatus transported to the gas storage apparatus, wherein when the power supply system is in power consumption peaks, the carbon monoxide in the gas storage apparatus is transported to the energy provision unit for generating energy.

The above are only preferred embodiments of the present application, and are not intended to limit the present application. For those skilled in the art, the present application can be modified and varied. Any modification, equivalent, improvement, and the like made within the spirit and principle of the present application shall all fall within the protection scope of the present application.

For those skilled in the art, it is evident that the present application is not limited to the details of the exemplary embodiments described above, and it can be implemented in other specific forms without departing from the spirit or essential characteristics of the present application. Therefore, from any perspective, the embodiments should be considered exemplary and non-limiting. The scope of the present application is defined by the appended claims rather than the above description. All changes falling within the meaning and scope of equivalency of the claims are therefore intended to be embraced herein. No reference numeral in the claims should be construed as limiting the claims concerned.

The invention claimed is:

1. A power supply and energy storage system using carbon as a medium,
wherein the power supply and energy storage system comprises an energy provision unit, a heat conversion unit, a power supply unit, and a carbon dioxide collection unit, wherein
the energy provision unit comprises renewable energy sources, a diesel generator, a battery, and hydrogen storage;
the heat conversion unit comprises a first compressor set, an energy release assembly, a first expander set, and an energy absorption assembly which are sequentially connected, wherein the energy release assembly exchanges heat with a hot tank, the energy absorption assembly exchanges heat with a cold tank, and the first compressor set is provided with energy by the energy provision unit;
the power supply unit comprises a pressure boosting unit, a first carbon dioxide storage tank, a first heat exchanger, a first expander set, a second heat exchanger, and a second carbon dioxide storage tank which are sequentially connected, wherein the energy provision unit provides energy for the pressure boosting unit, the first heat exchanger utilizes heat of the hot tank, the second heat exchanger utilizes heat of the cold tank, and the first expander set applies work to the outside through a generator; and
the carbon dioxide collection unit comprises a cooling unit, an absorption tank, a transit tank, a third heat exchanger, a regeneration tank, and a second compressor set along with a sequestration device connected thereto, which are sequentially connected, wherein the transit tank comprises a first-stage transit tank and a second-stage transit tank, the cooling unit is provided with energy by the energy provision unit, and the carbon dioxide collection unit is used to collect carbon dioxide from the combustion vent gas of the diesel generator, and the collected carbon dioxide is used for energy transfer of the heat conversion unit;
the renewable energy sources comprise solar energy and wind energy, and the diesel generator, the battery, and the hydrogen storage are used to make up for power supply gaps of solar energy and wind energy;
with a target of minimizing an average annual comprehensive cost C of the energy provision unit, a target function of a capacity configuration model for solar energy, wind energy, the diesel generator, the battery, and the hydrogen storage is:

$$\min C = \min(1/N \; C_1 + C_2 + C_3 + C_4)$$

wherein N represents a planned service life of the energy provision unit, $C_1$ represents a total one-time cost of all devices of the energy provision unit, $C_2$ represents an operation and maintenance cost of the energy provision unit per year, $C_3$ represents a penalty cost of insufficient energy provision, and $C_4$ represents a penalty cost of excessive energy provision;

$$C_3 = \mu \sum_{t=0}^{T} P_{loss} \Delta t$$

$$P_{loss} = \begin{cases} 0, & P_m \leq P_{mj} \\ P_m - P_{mj}, & P_m > P_{mj} \end{cases}$$

wherein μ represents a penalty coefficient for electric power shortage, $P_{loss}$ represents a power gap of the energy provision unit, $\Delta t$ represents a time step, T represents a calculation cycle, $P_{mj}$ represents power generated by the energy provision unit, and $P_m$ represents a sum of power of all loads, comprising a power consumption load and a loading load of the carbon dioxide collection unit in the power supply and energy storage system;

$$C_4 = \rho \sum_{t=0}^{T} P_{waste} \Delta t$$

$$P_{waste} = \begin{cases} 0, & P_{mj} \leq P_m \\ -(P_m - P_{mj}), & P_{mj} > P_m \end{cases}$$

wherein ρ represents a penalty coefficient for residual electricity, $P_{waste}$ represents remaining power of the energy provision unit, $\Delta t$ represents a time step, T represents a calculation cycle, $P_{mj}$ represents power generated by the energy provision unit, and $P_m$ represents a sum of power of all loads, comprising a power consumption load and a loading load of the carbon dioxide collection unit in the power supply and energy storage system.

2. The power supply and energy storage system using carbon as a medium according to claim 1, wherein a sum of power generated by solar power generation, wind power generation, the diesel generator, the battery, and the hydrogen storage is equal to the sum of power of all loads, namely:

$$P_s + P_w + P_c = P_m,$$

wherein $P_s$ represents the output power of solar power generation, $P_w$ represents the output power of wind power generation, and $P_c$ represents the output power of the diesel generator, the battery, and the hydrogen storage.

3. The power supply and energy storage system using carbon as a medium according to claim 2, wherein solar power generation satisfies a maximum power constraint, namely $0 \leq P_s \leq P_{smax}$, wherein $P_{smax}$ represents the maximum output power of solar power generation;
wind power generation satisfies a maximum power constraint, namely $0 \leq P_w \leq P_{wmax}$, wherein $P_{wmax}$ represents the maximum output power of wind power generation; and
the diesel generator, the battery, and the hydrogen storage satisfy a maximum power constraint, namely $0 \leq P_c \leq P_{cmax}$, wherein $P_{cmax}$ represents the maximum output power of the diesel generator, the battery, and the hydrogen storage.

4. The power supply and energy storage system using carbon as a medium according to claim 1, wherein the capacity configuration model of solar energy, wind energy, the diesel generator, the battery, and the hydrogen storage is solved by a quantum-behaved particle swarm optimization algorithm.

5. The power supply and energy storage system using carbon as a medium according to claim 3,
wherein a rate of putting into use $\delta_c$ of the diesel generator, the battery, and the hydrogen storage is:

$$\delta_c = \frac{P_b}{P_m} = \frac{P_m - P_s - P_w}{P_m} \leq \delta_{cmax}$$

wherein in the formula, $P_b$ represents a power deficit of the renewable energy sources; $\delta_{cmax}$ represents a maximum rate of putting into use of the diesel generator, the battery, and the hydrogen storage.

6. The power supply and energy storage system using carbon as a medium according to claim 5, wherein the power deficit $P_b$ of the renewable energy sources is converted from discrete data in a time domain into a frequency and amplitude in a frequency domain using discrete Fourier transform, based on energy and power characteristics of the diesel generator, the battery, and the hydrogen storage, frequency compensation bands for the diesel generator, the battery, and the hydrogen storage are determined according to a spectrum analysis result, and frequency-domain data are then converted into time-domain data by inverse discrete Fourier transform, such that power deficits allocated to the diesel generator, the battery, and the hydrogen storage at each moment can be obtained.

7. The power supply and energy storage system using carbon as a medium according to claim 1, further comprising:
a pressurizing apparatus, connected to the heat conversion unit and collecting and pressurizing carbon monoxide generated in the heat conversion unit; and
a gas storage apparatus, connected to the pressurizing apparatus and the energy provision unit, with the pressurized carbon monoxide by the pressurizing apparatus transported to the gas storage apparatus,
wherein when the power supply system is in power consumption peaks, the carbon monoxide in the gas storage apparatus is transported to the energy provision unit for generating energy.

* * * * *